UNITED STATES PATENT OFFICE.

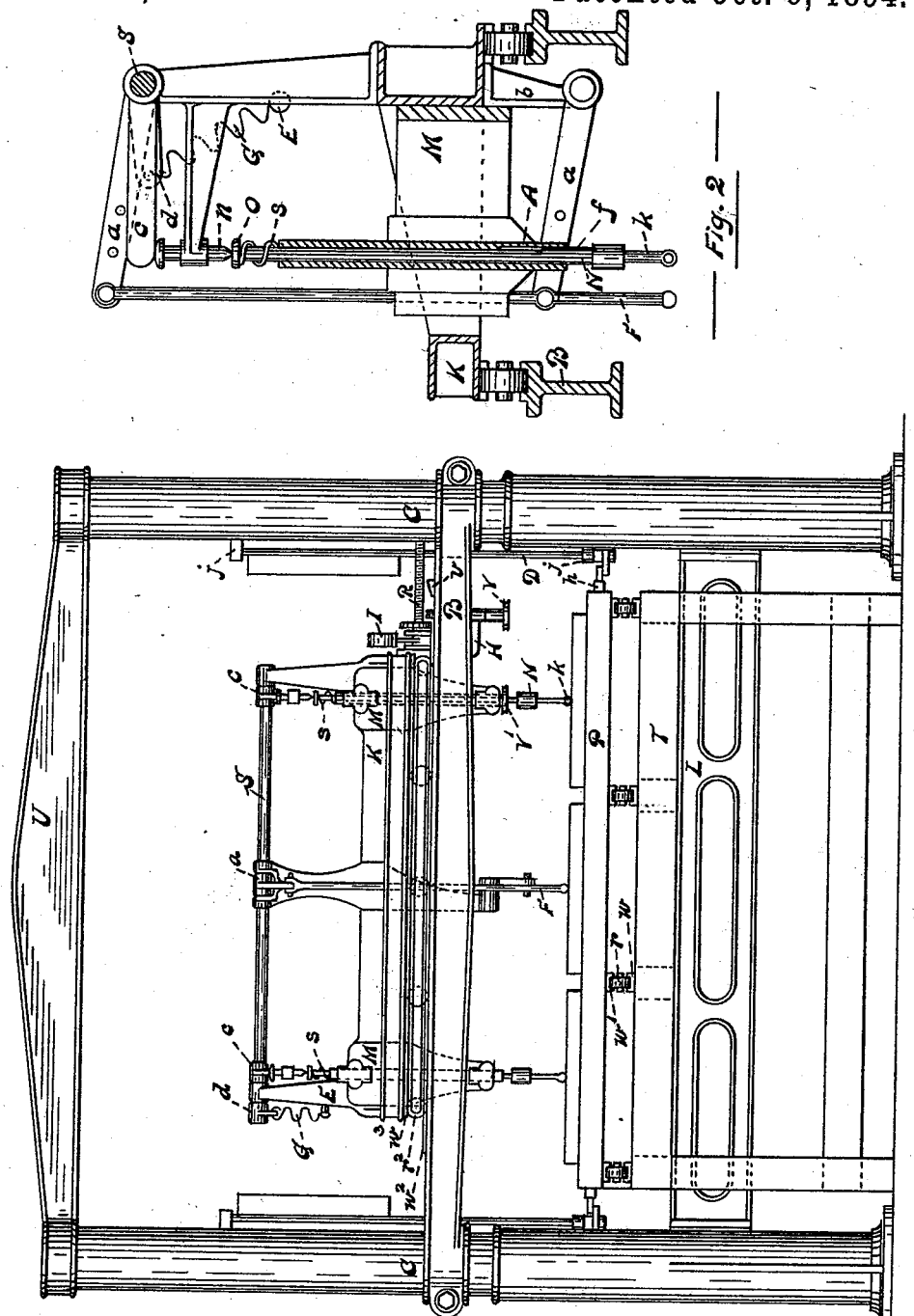

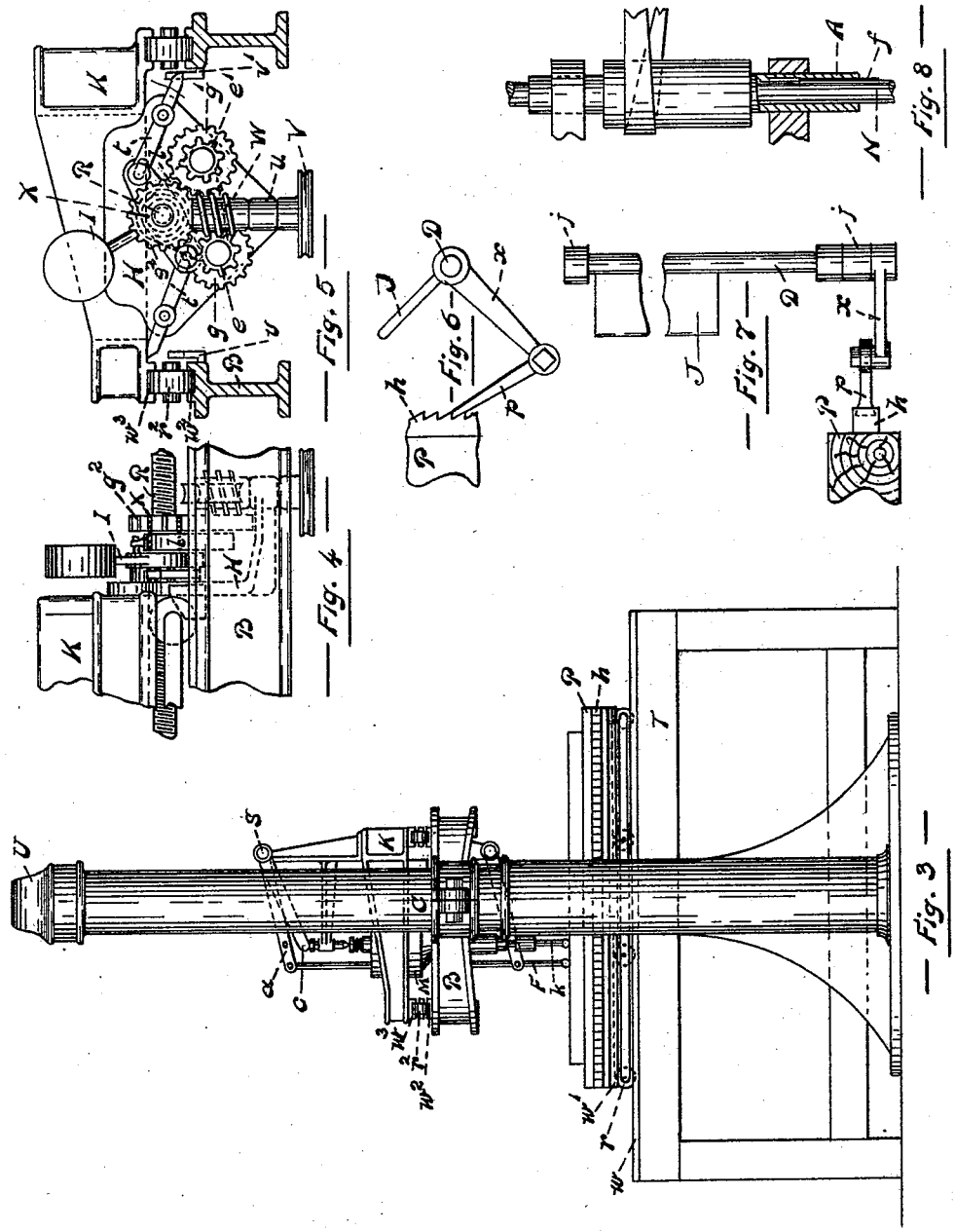

WILLIAM MAYBECK, OF SOMERVILLE, MASSACHUSETTS.

CARVING-MACHINE.

SPECIFICATION forming part of Letters Patent No. 527,152, dated October 9, 1894.

Application filed February 20, 1894. Serial No. 500,883. (No model.)

*To all whom it may concern:*

Be it known that I, WILLIAM MAYBECK, a citizen of the United States, residing at Somerville, in the county of Middlesex and State of Massachusetts, have invented a new and useful Carving-Machine, of which the following is a specification.

This invention relates to improvements in automatic carving machines in which a series of rapidly revolving cutters are automatically raised or depressed correspondingly with the movements of a guide or "feeler" as determined by a model or pattern, at the same time that an all-round movement is imparted alike to the model and to the blocks to be operated upon, or, which is equivalent the all-round movement may be imparted to the series of cutters and feeler alike while the blocks and model remain stationary, or, again, the two sets of movements may be wholly or partially combined, the latter method being the one more particularly affected by this invention.

The objects of my invention are first, by combining the rising and falling and the laterally vibrating movements of a series of tool-spindles with the intermittently progressive end-to-end movement of a platen on which are placed the model and blocks, each movement being controlled by a self-acting mechanism, to attain automaticity; second, by the introduction of an adjustable feeler, to furnish a method for varying the depth of the cut from that of the original model, and third, by the substitution of the torsional pull peculiar to electric motors in place of the lateral pull of high-speed belting, and by the adaptation of the tool spindle to a hollow driving shaft, more particularly to the hollow armature shaft of an electric motor, to obtain a more sensitive and more efficient tool-spindle.

The essential features of my invention are, a series of revoluble tool spindles each of which, being fitted to and within a hollow driving-shaft, has imparted to it a rapid rotary motion while a sliding key or "feather" and corresponding groove permit a lineal movement of the spindle within the hollow shaft; a series of arms controlling the vertical position of a corresponding series of revoluble spindles in conformity with the position of an adjustable guide or feeler as determined by the provided model or pattern; a vibratory carriage on which are mounted the revoluble spindles (and electric motors), the adjustable feeler, the controlling levers and a portion of the mechanism necessary to impart the vibratory movements to the carriage guided by the means of antifriction rollers and grooved ways along a track-bed which is adjustable with regard to the thickness of the blocks to be operated upon; a platen equipped with slots and bolts for "chucking" the work and model, which, also guided by antifriction rollers and grooved ways, has an intermittently progressive end-to-end movement at right angles to the direction of the vibratory carriage above it; a screw, nut and reversing mechanism for the purpose of imparting to the carriage the necessary vibratory movement, and, finally, pawls, ratchets and intermittently operating mechanism for the purpose of imparting to the chucking platen the progressive end-to-end movement. These features are each more fully described hereinafter, reference being had to the accompanying drawings in which similar letters and numbers refer to similar parts.

Figure 1 is a front elevation of the entire machine; Fig. 2, a sectional view showing especially the spindle and hollow shaft, as adapted to electric power; Fig. 3, a side elevation of the machine, the reversing mechanism being omitted; Fig. 4, a side elevation and Fig. 5 an end elevation of the reversing mechanism; Fig. 6 a plan and Fig. 7 a side elevation of the pawl and ratchet movement and Fig. 8 a sectional view of the spindle and hollow shaft as adapted to belt-transmitted power.

The two side columns " C. C." are united by the braces " U. L." forming the main frame of the machine, the lower brace " L." serving as a partial support to the platform " T." which, whether constructed of wood as shown or otherwise, is provided with grooved ways " w. w." along which roll the antifriction rollers " r. r." preferably framed in gangs as shown. Upon these rollers and guided by a similar set of grooved ways " w'. w'." upon its under surface, the platen " P." is propelled endwise and intermittently as the work progresses, the desired motion being imparted by means of the mechanism hereinafter described. "B." the track-bed is provided with cylindrical ends bored to fit the upper and "turned" portion of the side columns "C. C." and split and provided with bolts for the purpose of clamping in any desired vertical position. Along the upper surface of the track-bed are the grooved ways "$w^2$. $w^2$." adapted to the antifriction rollers "$r^2$. $r^2$." upon which the spindle carriage "K." also provided with grooved ways "$w^3$. $w^3$." vibrates.

To the carriage "K" are attached a series of electric motors "M. M." in number corresponding to the desired ratio of reproduction, two being the number chosen in the present instance for simplicity of illustration. The electric motors are specially adapted to this invention by being provided with hollow armature shafts.

To each armature shaft "A" is fitted a tool spindle "N" provided at its lower end with a chuck for holding the cutting tool $k$. The upper end is fitted to the cone-pin "$n$." A feather or key "$f$" attached to the spindle fits and slides in a corresponding groove in the armature shaft so that while the spindle "N" must revolve with the armature-shaft "A" it is free to rise and fall within it. Between the top end of the armature shaft and the collar "$o$" and encircling the tool-spindle is a coiled spring "$s$" which tends to retain the tool-spindle "N" and cone-pin "$n$" at their uppermost positions, while a coiled spring "G," in strength more than that of the entire series of springs "$s$," attached to the lever "$d$" and bracket "E" tends to hold the controlling levers "$c. c.$," the perforated arms "$a. a.$," and the feeler "F" each in its lowest position. The guide-spindle or feeler "F" being supported in position at or about the center of the carriage "K" by the perforated arms "$a. a.$" severally attached to the controlling shaft "S" and the auxiliary bracket "$b$." The object of the perforations of the arms "$a. a.$" is that by varying the position thereon of the guide spindle or feeler "F" and consequently the motion of the controlling shaft "S" the depth of cut may be varied somewhat from that of the original model.

To obtain the necessary vibratory movement of the carriage "K" a bracket "H" is attached to it having a projecting hub "$u$" carrying a worm spindle "W" driven by the grooved pulley "V" from the corresponding pulley "V'" attached to any convenient armature shaft, the worm engaging with either of the worm-wheels "$e$" or "$e'$" which are attached to their respective change-gears "$g$, $g'$" and revolve upon pins projecting from the swinging plate "$l$." The change-gears "$g, g'$" are constantly in mesh with the gear "$g^2$" attached to a nut "X" upon the hub of which the plate "$l$" swings, the nut working on the screw "R" attached to the side column "C." The weighted lever "I," also swinging on the nut hub, by means of suitable projections upon it and upon the swinging plate moves the latter from side to side causing one of the worm-wheels "$e$" or "$e'$" to engage with the worm "W" as either of the levers "$t, t'$" which are attached to the plate "$l$" may be tilted by encountering its corresponding cam "$v$" or "$v'$" both adjustable on the track-bed "B" thereby determining the extent and direction of the movement of the carriage.

To obtain the intermittently progressive movement of the platen "P," to each column "C. C" are attached bearings "$j. j$" carrying a spindle "D" having at its upper end a wing "J" and at its lower end an arm "$x$" carrying a pawl "$p$" which engages with the ratchet "$h$" on the platen "P" causing the latter to move forward as either end of the carriage "K" strikes and presses its corresponding wing "J" and causes its spindle to partially revolve. Each pawl and spindle, as the carriage recedes from it, resumes its normal position by means of suitable springs.

The operation of the machine is briefly as follows: The design to be reproduced is bolted directly under the feeler "F" and the blocks to be operated upon equally on each side of it and correspondingly under their respective cutters. The projection and indentations of the model as the feeler passes over it cause corresponding elevations and depressions of the cutting tools. When the feeler and tools have traversed the model and blocks the reversing mechanism causes the carriage to return and, simultaneously the carriage having pressed the wing which operates the pawl and ratchet, the platen advances a step and exposes a new section of the blocks to the operation of the cutters while the feeler traverses a new section of the model, the several motions being repeated "*ad libitum.*"

Having thus described my invention, what I claim as new, and desire to secure by Letters Patent, is—

1. In an automatic carving machine, one or more rotary motors, preferably electric motors, adjustable to a fixed position with relation to the model, each having a hollow driving shaft with a longitudinal internal groove, in combination with their respective tool-spindles each provided with a corresponding key or feather, thus permitting a lineal movement within and independent of said driving-shafts, and a proportionally adjustable guide or feeler, together with means whereby the longitudinal movements of the feeler are to a greater, equal or less degree synchronously imparted to the revoluble tool-spindles, all substantially as shown and for the purpose specified.

2. In an automatic carving machine, the combination of one or more tool spindles "N" provided with feather "$f$," motor shaft "A" internally and longitudinally grooved, and the perforated arms "*a, a,*" and feeler "F" with the controlling shaft "S," levers "*c, c,*" springs "*s, s,*" and "G," all supported on motor carriage "K" substantially as shown and described.

3. In an automatic carving machine, a carriage to which an end-to-end movement is imparted by suitable mechanism and to which are attached rotary motors provided with hollow driving shafts having longitudinal internal grooves, revoluble tool-spindles with sliding keys or feathers providing for lineal movement within and independent of the driving shafts and means for imparting said lineal movement to tool spindles as determined by an adjustable feeler, in combination with a chucking platen and means for imparting thereto an end to end movement at right angles to that of the motor carriage, all substantially as shown and described.

4. In an automatic carving machine the combination of a main screw and corresponding nut; worm, worm-wheels and change-gears; weighted lever and swinging plate; tilting levers and adjustable cams, with the vibratory carriage and adjustable track-bed, all substantially as set forth.

5. In an automatic carving machine, the combination of the winged spindles, levers and pawls, with the vibratory carriage and ratcheted chucking platen all substantially as shown and for the purpose specified.

WILLIAM MAYBECK.

Witnesses:
ROBERT BOOTH,
WILSON R. RICHARDSON.